(12) United States Patent
Kim

(10) Patent No.: US 12,270,454 B2
(45) Date of Patent: *Apr. 8, 2025

(54) FREQUENCY SENSITIVE TYPE SHOCK ABSORBER

(71) Applicant: HL MANDO CORPORATION, Gyeonggi-do (KR)

(72) Inventor: Namho Kim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 72 days.

This patent is subject to a terminal disclaimer.

(21) Appl. No.: 18/109,845

(22) Filed: Feb. 14, 2023

(65) Prior Publication Data

US 2023/0193974 A1    Jun. 22, 2023

Related U.S. Application Data

(63) Continuation of application No. 16/880,989, filed on May 22, 2020, now Pat. No. 11,598,389.

(30) Foreign Application Priority Data

May 22, 2019  (KR) .................. 10-2019-0060086

(51) Int. Cl.
  *F16F 9/512*   (2006.01)
  *F16F 9/32*    (2006.01)
  (Continued)

(52) U.S. Cl.
  CPC .......... *F16F 9/5126* (2013.01); *F16F 9/3214* (2013.01); *F16F 9/3221* (2013.01);
  (Continued)

(58) Field of Classification Search
  CPC ...... F16F 9/5126; F16F 9/3214; F16F 9/3221; F16F 9/3405; F16F 9/3482; F16F 9/3487; F16F 9/348; F16F 2228/04; F16F 2230/36
  See application file for complete search history.

(56) References Cited

U.S. PATENT DOCUMENTS 4,503,951 A * 3/1985 Imaizumi ................ F16F 9/516
                                                      267/64.15
9,534,653 B2 * 1/2017 Kim ...................... F16F 9/3405
(Continued)

FOREIGN PATENT DOCUMENTS

KR   10-2015-0112801 A    10/2015
KR   10-2017-0087761 A    7/2017

OTHER PUBLICATIONS

Office Action from the corresponding Korean Patent Application No. 10-2019-0060086 dated Feb. 26, 2024.
(Continued)

*Primary Examiner* — Xuan Lan Nguyen
(74) *Attorney, Agent, or Firm* — WOMBLE BOND DICKINSON (US) LLP

(57) ABSTRACT

Disclosed is a frequency sensitive type shock absorber including a piston rod reciprocating an inside of a cylinder and having a connection passage therein; a piston valve mounted on the piston rod and having a plurality of compression and rebound flow paths penetrating up and down thereof, and partitioning the cylinder into compression and rebound chambers; and a valve assembly mounted on the piston rod to generate a damping force that changes with frequency during a rebound stroke; wherein the valve assembly comprises: a housing coupled to the piston rod and having a pilot chamber in communication with the connection passage; a main retainer coupled to the piston rod and having a main chamber formed on an upper portion thereof (Continued)

in communication with the connecting passage; and a pilot valve coupled to the piston rod and disposed between the housing and the main retainer to partition the pilot chamber and the main chamber.

18 Claims, 9 Drawing Sheets

(51) Int. Cl.
*F16F 9/34* (2006.01)
*F16F 9/348* (2006.01)

(52) U.S. Cl.
CPC .......... *F16F 9/3405* (2013.01); *F16F 9/3482* (2013.01); *F16F 9/3487* (2013.01); *F16F 2228/04* (2013.01); *F16F 2230/36* (2013.01)

(56) References Cited

U.S. PATENT DOCUMENTS

| | | |
|---|---|---|
| 9,732,819 B2 | 8/2017 | Kim |
| 9,976,622 B2 | 5/2018 | Kim |
| 2015/0210136 A1 | 7/2015 | Taraoka et al. |
| 2020/0370616 A1 | 11/2020 | Kim |

OTHER PUBLICATIONS

Notice of Allowance dated Nov. 7, 2022 for U.S. Appl. No. 16/880,989 (now published as 2020/0370616).
Office Action dated May 19, 2022 for U.S. Appl. No. 16/880,989 (now published as 2020/0370616).

\* cited by examiner

[FIG. 1]
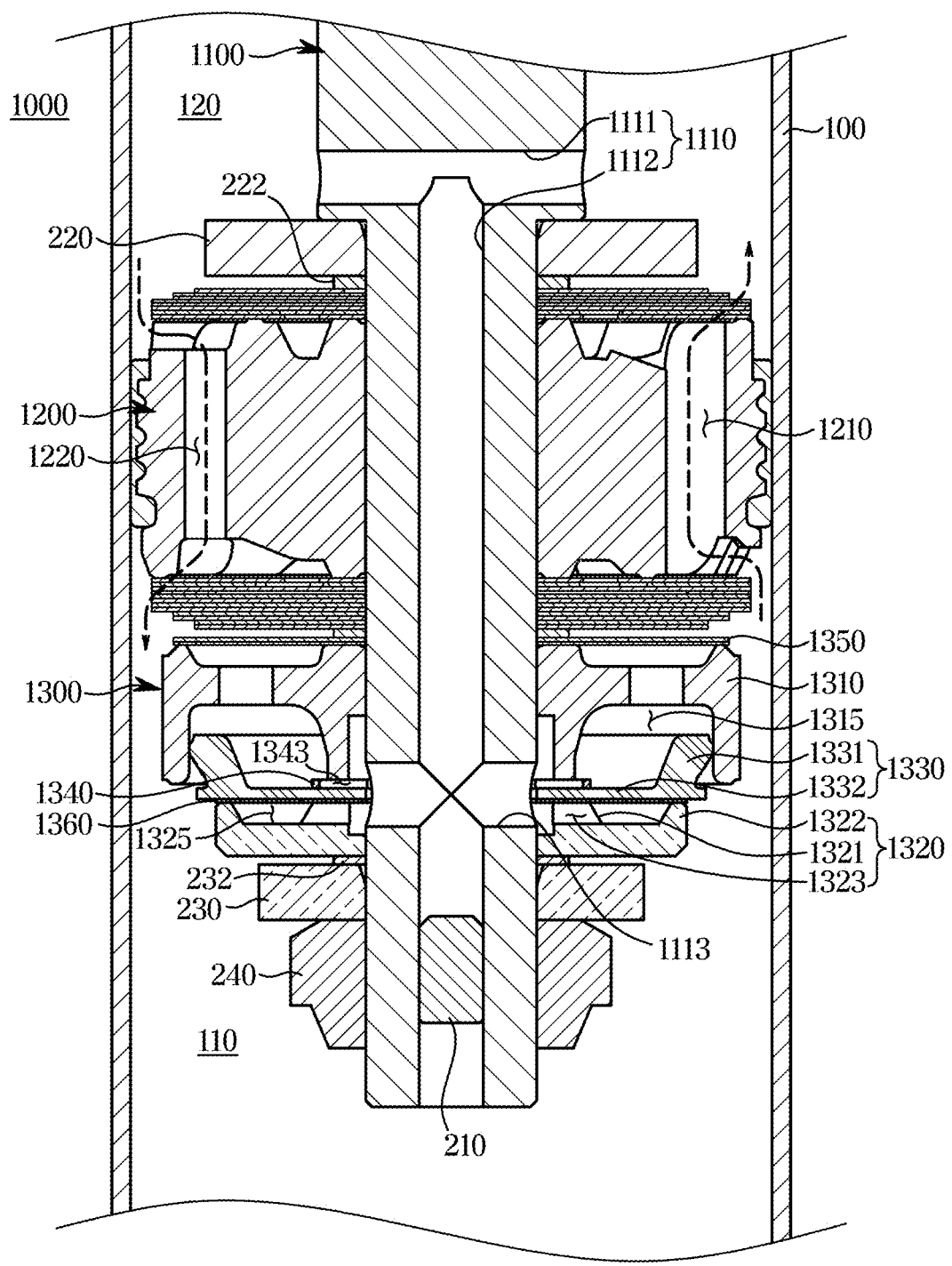

[FIG. 2]
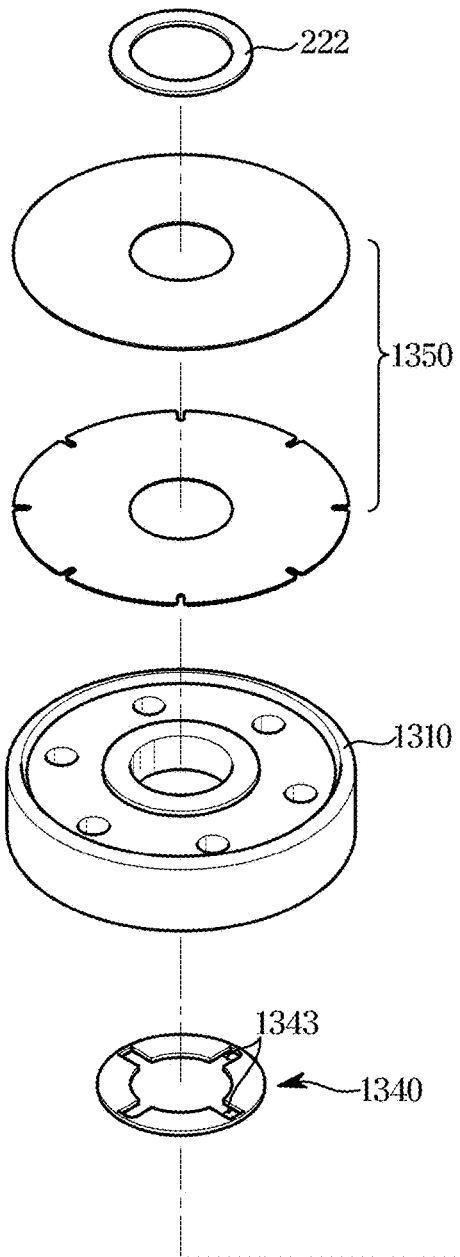
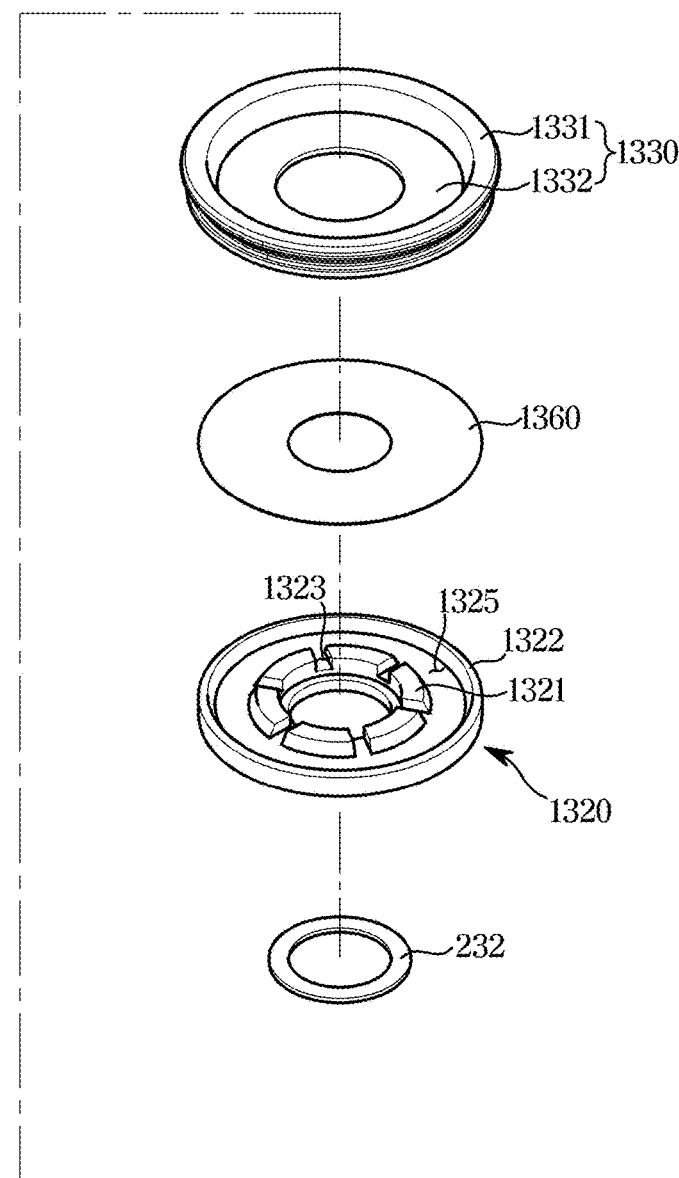

[FIG. 3]
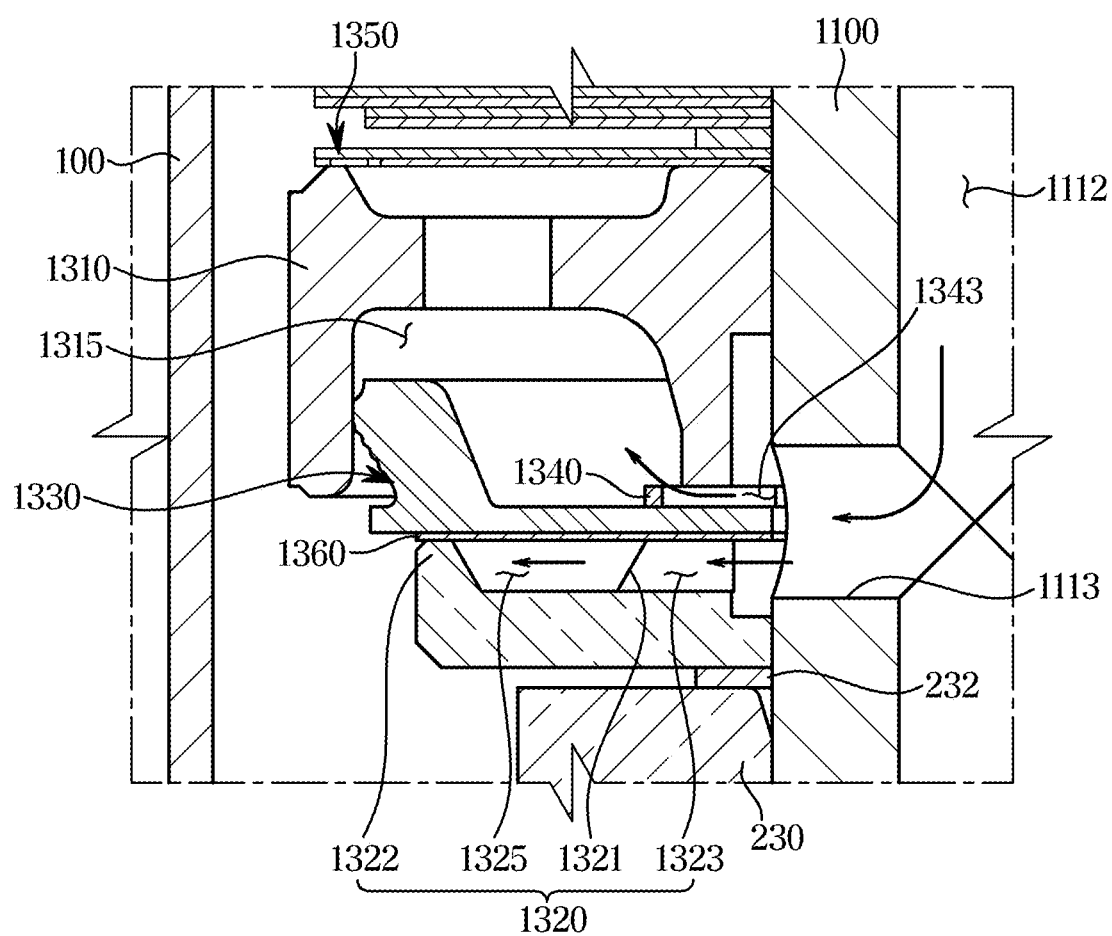

[FIG. 4]
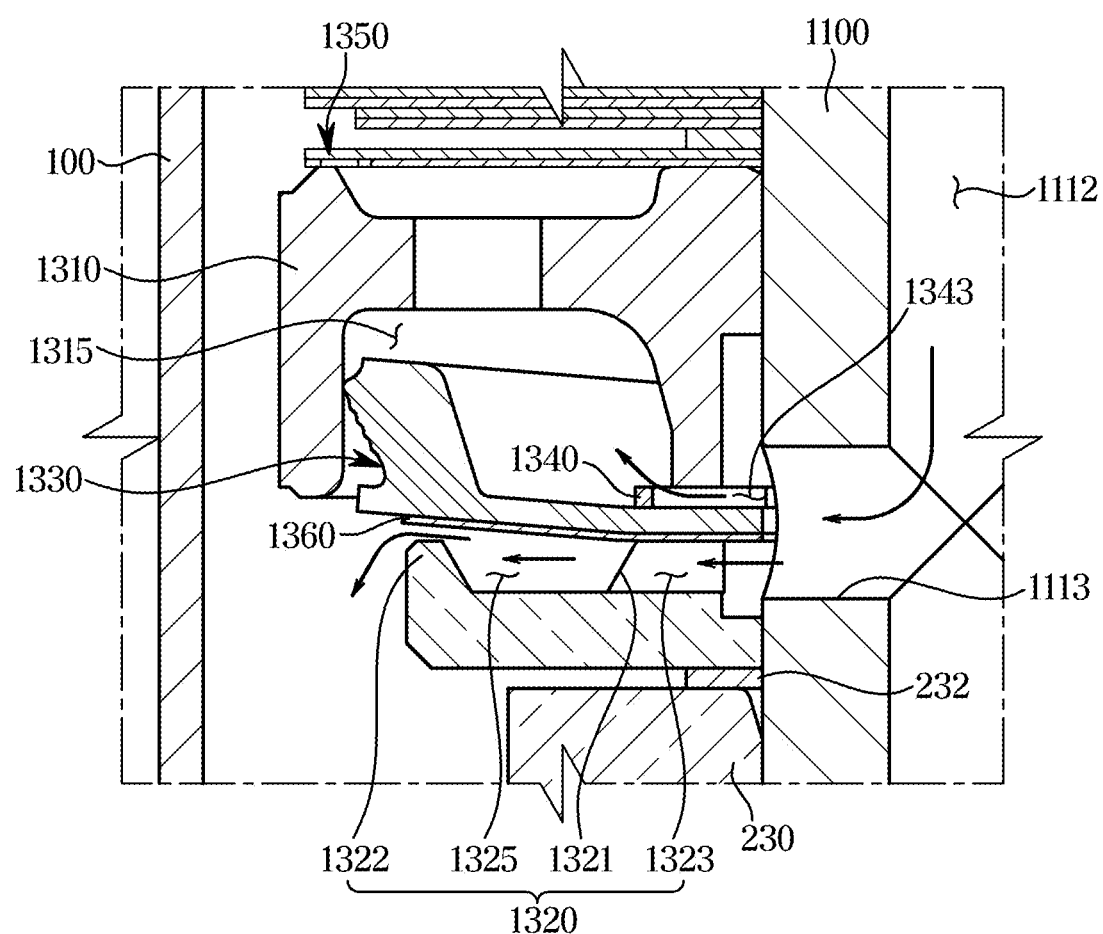

[FIG. 5]
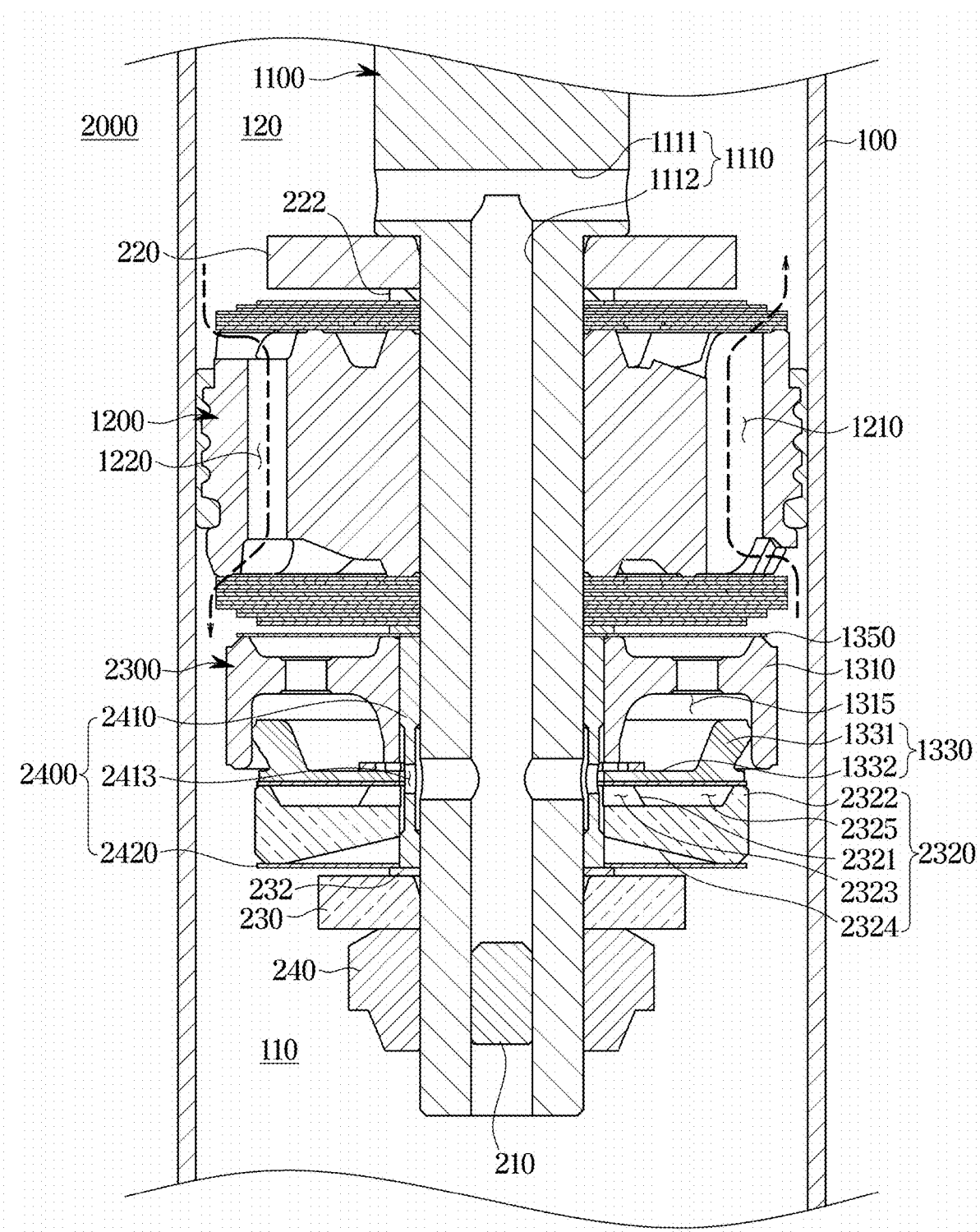

[FIG. 6]
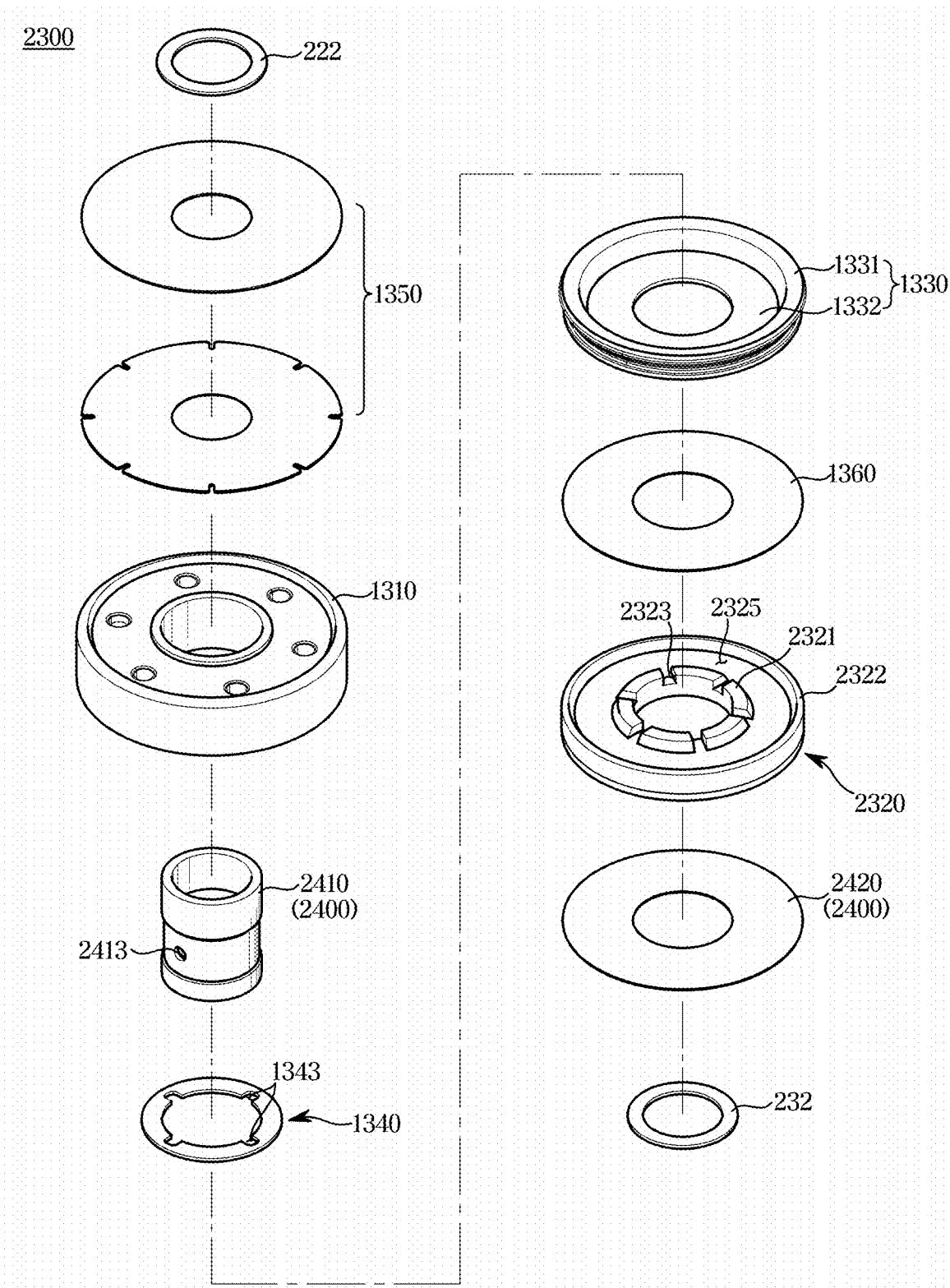

[FIG. 7]
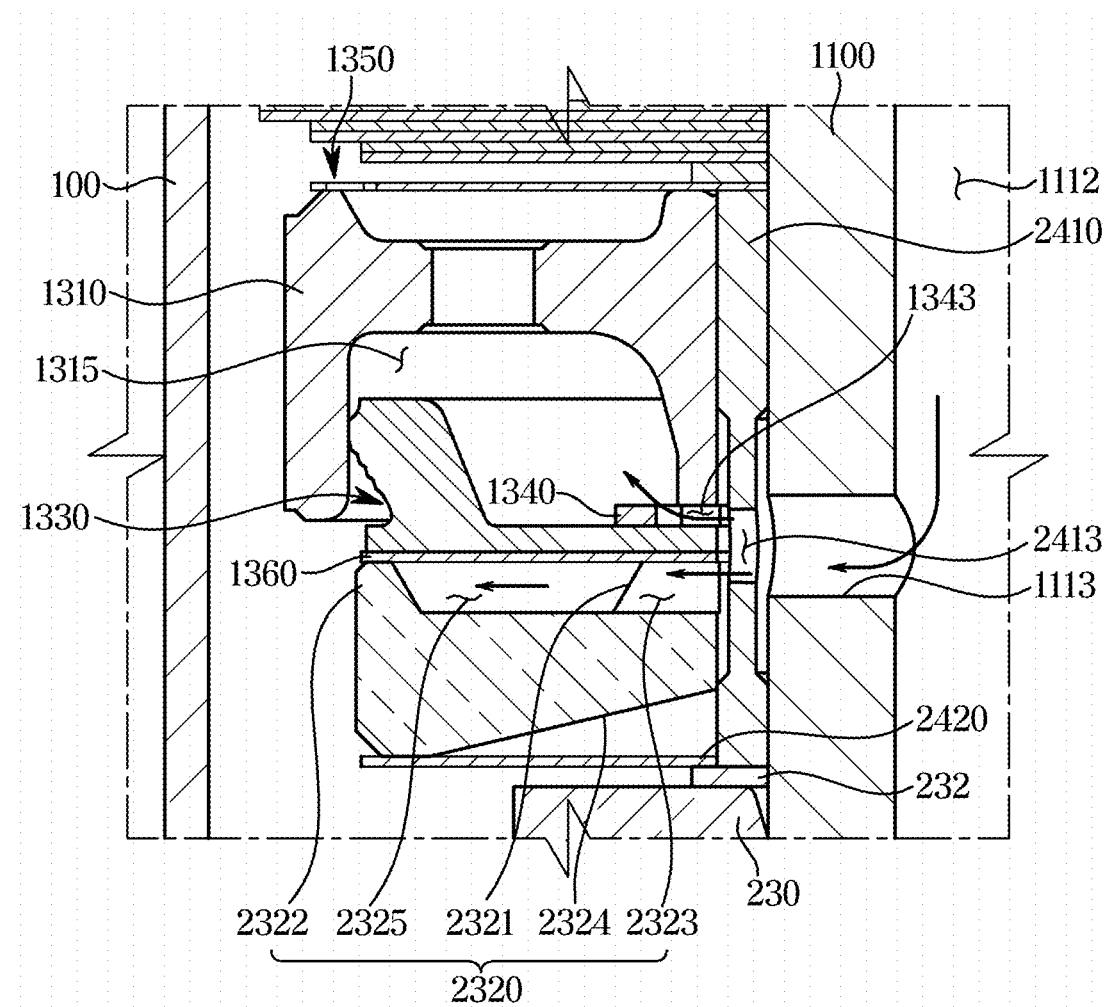

[FIG. 8]
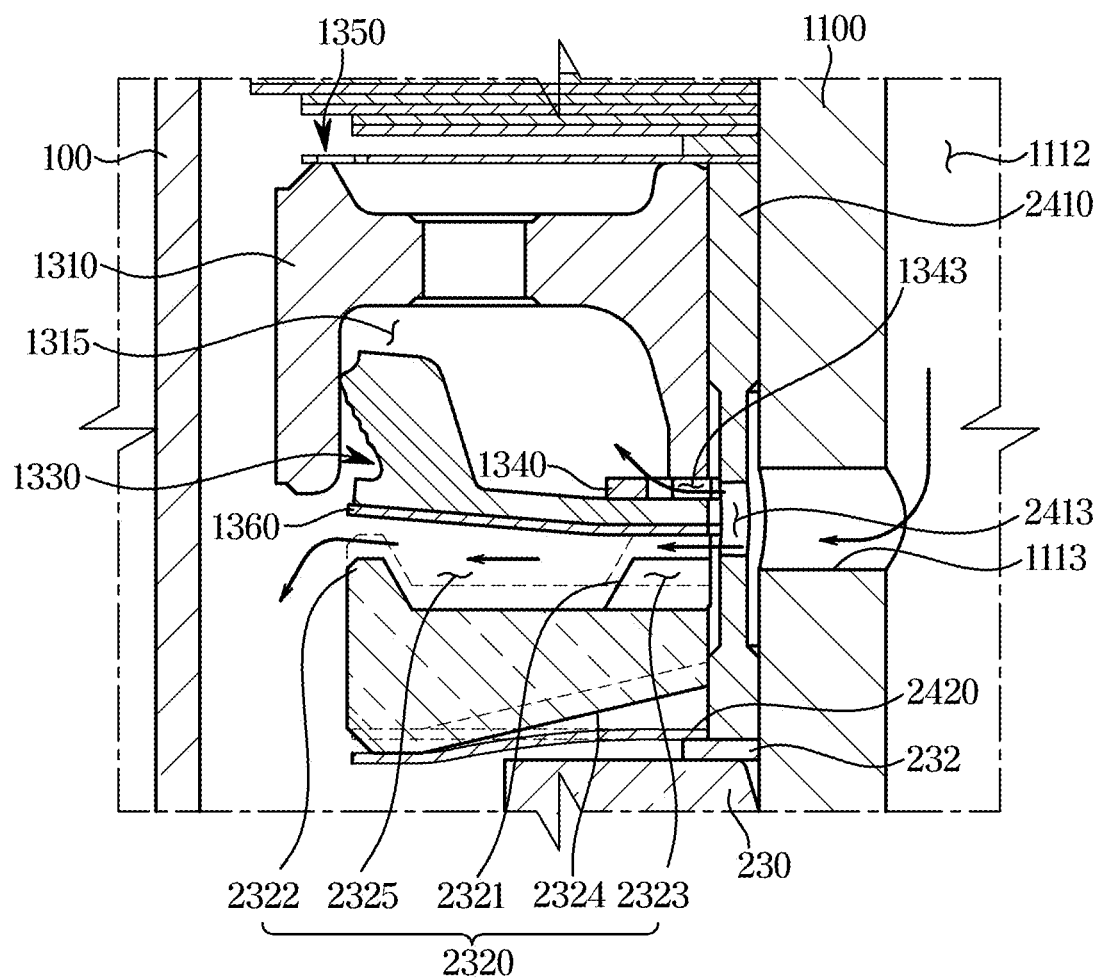

[FIG. 9]
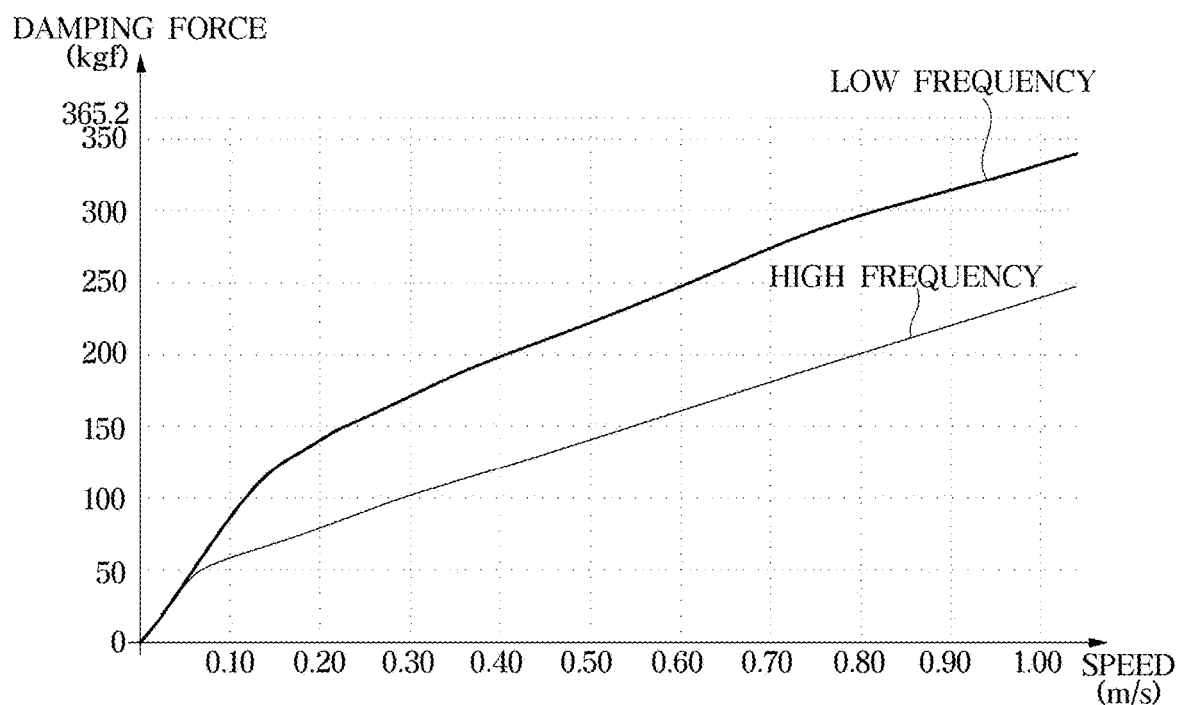

FREQUENCY SENSITIVE TYPE SHOCK ABSORBER

CROSS-REFERENCE TO RELATED APPLICATIONS

This application is a continuation of U.S. patent application Ser. No. 16/880,989 filed on May 22, 2020, which claims the priority to Korean Patent Application No. 10-2019-0060086 filed in the Korean Intellectual Property Office on May 22, 2019, the entire contents of which are incorporated herein by reference.

BACKGROUND

1. Field

The present disclosure relates to a frequency sensitive type shock absorber, and more specifically, to satisfy both ride comfort and adjustment stability by controlling damping force for high and low frequencies during compression and rebound strokes of a piston valve, respectively.

2. Description of Related Art

In general, a damping device is equipped with a vehicle to improve ride comfort by absorbing shock or vibration applied from a road surface when driving, and a shock absorber is used as one of the damping devices.

The shock absorber is operated by the vibration of the vehicle depending on road surface condition. At this time, damping force generated in the shock absorber varies depending on operating speed of the shock absorber, that is, when the operating speed is fast or slow.

Adjusting damping force characteristics of the shock absorber is very important when designing the vehicle, because the ride comfort and the adjustment stability of the vehicle may be controlled according to how the damping force characteristics generated in the shock absorber are controlled.

Such shock absorbers are typically provided with a cylinder filled with working fluid (oil), a piston rod connected to a vehicle body to reciprocate, and a piston valve coupled to the bottom of the piston rod to slide inside the cylinder and control flow of the working fluid.

Since the piston valve is designed to have a constant damping characteristic at high speed, medium speed, and low speed using a single flow path, it may affect the medium and high speed damping force when attempting to improve the ride comfort by lowering the low speed damping force. In addition, conventional shock absorbers have a structure in which the damping force changes depending on a speed change of the piston regardless of frequency or stroke. As described above, since the damping force changed only depending on the speed change of the piston generates the same damping force in various road surfaces, it is difficult to satisfy both the ride comfort and the adjustment stability.

Therefore, since the damping force may be varied according to various road conditions, that is, frequency and stroke, it is necessary to continuously research and develop a valve structure of the shock absorber that may satisfy both the ride comfort and the adjustment stability of the vehicle.

SUMMARY

It is an aspect of the present disclosure to provide a frequency sensitive type shock absorber with a valve assembly that generates a damping force that changes according to a change in frequency and speed together with a piston valve, thereby satisfying both the vehicle's ride comfort and adjustment stability.

Additional aspects of the disclosure will be set forth in part in the description which follows and, in part, will be obvious from the description, or may be learned by practice of the disclosure.

In accordance with one aspect of the present disclosure, a frequency sensitive type shock absorber includes a piston rod reciprocating an inside of a cylinder and having a connection passage therein; a piston valve mounted on the piston rod and having a plurality of compression and rebound flow paths penetrating up and down thereof, and partitioning the cylinder into compression and rebound chambers; and a valve assembly mounted on the piston rod to generate a damping force that changes with frequency during a rebound stroke; wherein the valve assembly includes a housing coupled to the piston rod and having a pilot chamber in communication with the connection passage; a main retainer coupled to the piston rod and having a main chamber formed on an upper portion thereof in communication with the connecting passage; and a pilot valve coupled to the piston rod and disposed between the housing and the main retainer to partition the pilot chamber and the main chamber.

Further, the main retainer includes a first seat portion through which the piston rod penetrates centrally, and protruding at regular intervals along an inner edge thereof; and a second seat portion having a ring-shaped and stepped protruding from an outer edge of the main retainer; wherein the main chamber is formed between the first seat portion and the second seat portion, and a main flow path in communication with the connection passage is provided between the first seat portions.

Further, the pilot valve may be provided to be elastically deformable by pressure difference between the main chamber and the pilot chamber.

Further, the pilot valve includes a body portion whose a bottom surface is in close contact with the upper portion of the main retainer; and a valve portion protruding along an outer edge portion of the body portion to be close contact with an inner surface of the housing, and elastically deformable depending on pressure difference due to an inflow amount of the working fluid flowing into the main chamber.

Further, the pilot valve may be in contact with the upper portion of the main retainer during a low-frequency stroke, and is spaced apart from the upper portion of the main retainer to open the main chamber during a high-frequency stroke.

Further, the frequency sensitive type shock absorber may further include an inlet disc interposed between the housing and the pilot valve and having at least one slit communicating the connection passage and the pilot chamber.

Further, the frequency sensitive type shock absorber may further include a pilot disk coupled to the piston rod, and disposed in close contact with the upper portion of the housing to be elastically deformable.

Further, the frequency sensitive type shock absorber may further include at least one or more disks interposed between the pilot valve and the main retainer.

In accordance with another aspect of the present disclosure, a frequency sensitive type shock absorber includes a piston rod reciprocating an inside of a cylinder and having a connection passage therein; a piston valve mounted on the piston rod and having a plurality of compression and rebound flow paths penetrating up and down thereof, and partitioning the cylinder into compression and rebound chambers; a support member formed a passage hole communicating with the connection passage, and mounted to the piston rod; and a valve assembly mounted on the support member and generating a damping force that changes with frequency during a rebound stroke; wherein the valve assembly includes a housing coupled to the support member and having a pilot chamber in communication with the passage hole; a main retainer coupled to the support member and having a main chamber formed on an upper thereof in communication with the passage hole; and a pilot valve coupled to the support member and disposed between the housing and the main retainer to partition the pilot chamber and the main chamber.

Further, the pilot chamber and the main chamber may be provided to communicate with the connection passage through the passage hole.

Further, the support member includes a first support mounted on the piston rod for supporting an axial force in a vertical direction of the valve assembly, and having the passage hole communicating with the connection passage; and a second support mounted on a lower portion of the first support to support a lower portion of the main retainer.

Further, the main retainer includes a first seat portion protruding at regular intervals along an inner edge thereof; and a second seat portion having a ring-shaped and stepped protruding from an outer edge of the main retainer; wherein the main chamber is formed between the first seat portion and the second seat portion, and a main flow path in communication with the connection passage is provided between the first seat portions.

Further, a lower surface of the main retainer may be provided with a tapered portion having a tapered shape that gradually decreases in thickness toward the center of the main retainer, the main retainer moves downward depending on pressure difference due to an inflow amount of the working fluid flowing into the main chamber by the tapered portion, and the second support is elastically deformable according to elastic deformation of the main retainer.

Further, a lower portion of the second support may be provided with a spacer.

Further, the pilot valve may be elastically deformable by pressure difference between the main chamber and the pilot chamber.

Further, the pilot valve includes a body portion whose a bottom surface is in close contact with the upper portion of the main retainer; and a valve portion protruding along an outer edge portion of the body portion to be close contact with an inner surface of the housing, and elastically deformable depending on pressure difference due to an inflow amount of the working fluid flowing into the main chamber.

Further, the pilot valve may be in contact with the upper portion of the main retainer during a low-frequency stroke, and is spaced apart from the upper portion of the main retainer to open the main chamber during a high-frequency stroke.

Further, the frequency sensitive type shock absorber may further include an inlet disc interposed between the housing and the pilot valve and having at least one slit communicating the connection passage and the pilot chamber.

Further, the frequency sensitive type shock absorber may further include a pilot disk coupled to the piston rod, and disposed in close contact with the upper portion of the housing to be elastically deformable.

Further, the frequency sensitive type shock absorber may further include at least one or more disks interposed between the pilot valve and the main retainer.

The frequency sensitive type shock absorber according to the various embodiments of the present disclosure is capable of satisfying both the ride comfort and the adjustment stability of the vehicle by installing the valve assembly together with the piston valve to generate the damping force that changes according to changes in frequency and speed.

In addition, the frequency sensitive type shock absorber according to the various embodiments of the present disclosure can prevent the performance of adjustment stability from being deteriorated by preventing a decrease in the damping force in a low-speed section during the rebound stroke in a low-frequency region.

In addition, the frequency sensitive type shock absorber according to the various embodiments of the present disclosure can improve the ride comfort by generating the damping force performance in a middle-high-speed section during the rebound stroke in a high-frequency region.

BRIEF DESCRIPTION OF THE DRAWINGS

These and/or other aspects of the present disclosure will become apparent and more readily appreciated from the following description of the embodiments, taken in conjunction with the accompanying drawings of which:

FIG. 1 is a cross-sectional view showing a frequency sensitive type shock absorber according to an embodiment of the present disclosure;

FIG. 2 is an exploded perspective view showing a valve assembly provided in the frequency sensitive type shock absorber according to the embodiment of the present disclosure;

FIG. 3 is a view showing the operating state of the valve assembly during a low-frequency rebound stroke of the frequency sensitive type shock absorber according to the embodiment of the present disclosure;

FIG. 4 is a view showing the operating state of the valve assembly during a high-frequency rebound stroke of the frequency sensitive type shock absorber according to the embodiment of the present disclosure;

FIG. 5 is a cross-sectional view showing a frequency sensitive type shock absorber according to another embodiment of the present disclosure;

FIG. 6 is an exploded perspective view showing a valve assembly provided in the frequency sensitive type shock absorber according to the another embodiment of the present disclosure;

FIG. 7 is a view showing the operating state of the valve assembly during a low-frequency rebound stroke of the frequency sensitive type shock absorber according to the another embodiment of the present disclosure;

FIG. 8 is a view showing the operating state of the valve assembly during a high-frequency rebound stroke of the frequency sensitive type shock absorber according to the another embodiment of the present disclosure; and FIG. 9 is a graph for explaining a change in damping force using the frequency sensitive type shock absorber according to the present disclosure.

DETAILED DESCRIPTION

Hereinafter, embodiments of the present disclosure will be described in detail with reference to the accompanying drawings. The following embodiments are provided to fully convey the spirit of the present disclosure to a person having ordinary skill in the art to which the present disclosure belongs. The present disclosure is not limited to the embodiments shown herein but may be embodied in other forms.

The drawings are not intended to limit the scope of the present disclosure in any way, and the size of components may be exaggerated for clarity of illustration. Like reference numerals designate like elements throughout, the specification.

FIG. 1 is a cross-sectional view showing a frequency sensitive type shock absorber according to an embodiment of the present disclosure, and FIG. 2 is an exploded perspective view showing a valve assembly provided in the frequency sensitive type shock absorber according to the embodiment of the present disclosure.

Referring to FIGS. 1 and 2, a frequency sensitive type shock absorber 1000 according to the present embodiment includes a piston rod 1100 reciprocating inside a cylinder 100, and a piston valve 1200 and a valve assembly 1300 which are mounted on the piston rod 1100.

The cylinder 100 may have a cylindrical shape forming a space therein, and working fluid (oil) is filled inside the cylinder 100. Herein, the interior of the cylinder 100 may be divided into a compression chamber 110 and a rebound chamber 120 by the piston valve 1200 to be described later.

The piston rod 1100 has one end located inside the cylinder 100 and the other end extending outside the cylinder 100 to be connected to a vehicle body side or a wheel side. The piston valve 1200 is mounted at one end of the piston rod 1100.

In addition, a connection passage 1110 is formed inside the piston rod 1100. The connection passage 1110 may be formed by being drilled such that a first flow path 1111 formed in a horizontal direction and a second flow path 1112 formed in a vertical direction cross each other. In addition, a connection hole 1113 communicating with the second flow path 1112 and communicating with a pilot chamber 1315 and a main chamber 1325 to be described later may be formed in the piston rod 1100. Therefore, the working fluid of the rebound chamber 120 may be introduced into the piston rod 1100 through the connection passage 1110 during a rebound stroke of the piston rod 1100. The structure in which the working fluid flows into the pilot chamber 1315 and the main chamber 1325 through the connection hole 1113 will be described again below.

Meanwhile, a plug 210 is installed a lower portion the second flow path 1112 of the connection passage 1110 to close the lower portion of the second flow path 1112. As the lower portion of the second flow path 1112 is closed by the plug 210, the working fluid is prevented from flowing through the connection passage 1110 during a compression stroke of the piston rod 1100 and the working fluid of rebound chamber 120 does not allow to flow directly to the compression chamber 110 during the rebound stroke of the piston rod 1100. A sealing member may be installed between the plug 210 and the second flow path 1112.

The piston valve 1200 is provided to reciprocally move the inside of the cylinder 100 filled with the working fluid together with the piston rod 1100 in a state which the piston rod 1100 is thoroughly coupled. A plurality of compression flow paths 1210 and rebound flow paths 1220 are formed to penetrate the piston valve 1200 so that the working fluid moves during the compression and the rebound strokes.

Accordingly, the piston valve 1200 generates damping force due to resistance force of the working fluid while reciprocating in compression and rebound stroke directions inside the cylinder 100.

For example, when the piston valve 1200 performs the compression stroke, pressure of the lower compression chamber 110 is increased compared to pressure of the upper rebound chamber 120. In this process, the working fluid filled in the compression chamber 110 by pressure rise of the compression chamber 110 moves to the rebound chamber 120 while pushing and opening valve means through the compression flow paths 1210 of the piston valve 1200.

Conversely, when the piston valve 1200 performs the rebound stroke, the pressure of the rebound chamber 120 rises higher than the pressure of the compression chamber 110, and in this process, the working fluid in the rebound chamber 120 moves to the compression chamber 110 while pushing and opening the valve means through the rebound flow paths 1210 of the piston valve 1200.

The valve assembly 1300 is mounted on the piston rod 1100 to be disposed under the piston valve 1200. The valve assembly 1300 may serve to generate the damping force that changes with frequency during the rebound stroke. More specifically, the valve assembly 1300 includes a housing 1310 in which the pilot chamber 1315 is formed in a lower portion thereof, a main retainer 1320 in which the main chamber 1325 is formed in an upper portion thereof, and a pilot valve 1330 disposed between the housing 1310 and the main retainer 1320 to partition the pilot chamber 1315 and the main chamber 1325.

The housing 1310 is coupled to the piston rod 1100, and the ring-shaped pilot chamber 1315 is formed around the piston rod 1100 on a bottom surface of the housing 1310. The pilot chamber 1315 is provided to communicate with an open portion of the housing 1310.

The main retainer 1320 is coupled to the piston rod 1100, and an upper portion thereof is opened and disposed at a lower portion of the housing 1310. The main chamber 1325 is formed in an open portion of the main retainer 1320.

More specifically, the main retainer 1320 includes a first seat portion 1321, in which the piston rod penetrates centrally, and which protrudes at regular intervals along an inner edge of the main retainer 1320, and a ring-shaped second seat portion 1322 stepped protruding from an outer edge of the main retainer 1320. Accordingly, the main chamber 1325 may be formed between the first seat portion 1321 and the second seat portion 1322.

The upper surfaces of the first seat portion 1321 and the second seat portion 1322 are in contact with the pilot valve 1330 positioned at an upper portion. In addition, as the first seat portion 1321 is formed to protrude at regular intervals along the inner edge of the main retainer 1320 hollowed by the piston rod 1100, between the first seat portions 1321 spaced apart from each other, the connection passage 1110, that is, a main flow path 1323 connected to the connection hole 1113 is provided.

The pilot valve 1330 is interposed between the housing 1310 and the main retainer 1320 so that the upper and lower portions thereof are in close contact with the housing 1310 and the main retainer 1320, respectively, thereby portioning and forming the pilot chamber 1315 and the main chamber 1325. The pilot valve 1330 may be provided to be elastically deformable by pressure difference between the pilot chamber 1315 and the main chamber 1325.

More specifically, the pilot valve 1330 includes a body portion 1332 in which a bottom surface thereof is in close contact with the upper portion of the main retainer 1320 and a valve portion 1331 that protrudes upward along an outer edge portion of the body portion 1332 and is in close contact with an inner surface of the housing 1310 in which the pilot chamber 1315 is formed. The body portion 1332 and the valve portion 1331 may be provided integrally, and may be made of a rubber material or a synthetic resin material to be elastically deformable. Therefore, the valve portion 1331 may be elastically deformable depending on pressure difference due to an inflow amount of the working fluid flowing into the main chamber 1325.

The pilot valve 1330 is in contact with the upper portion of the main retainer 1320 during a low-frequency stroke. For example, due to pressure balance between the pilot chamber 1315 and the main chamber 1325 during the low-frequency stroke, the pilot valve 1330 maintains contact with the upper portion of the main retainer 1320.

In addition, the pilot valve 1330 is configured to space apart from the upper portion of the main retainer 1320 to open the main chamber 1325 as the pressure of the main chamber 1325 increases more than the pressure of the pilot chamber 1315 during a high-frequency stroke.

Meanwhile, the valve assembly 1300 may further include an inlet disc 1340 and a pilot disc 1350.

The inlet disc 1340 is interposed between the housing 1310 and the pilot valve 1330. The inlet disc 1340 is formed with at least one slit 1343 communicating the connection passage 1110, that is, the connection hole 1113 and the pilot chamber 1315 so that the working fluid flows into the pilot chamber 1315. As shown in FIG. 2, the slit 1343 is formed from a hollow portion of the inlet disc 1340 through which the piston rod 1100 passes to a position in communication with the pilot chamber 1315. Accordingly, the connection hole 1113 and the pilot chamber 1315 may be communicated through the slit 1343. At this time, by adjusting the number and size of the slits 1403, the inflow amount of the working fluid flowing into the pilot chamber 1315 can be controlled.

Herein, the connection hole 1113 is preferably located between the slit 1342 of the inlet disc 1340 and the main flow path 1323 of the main retainer 1320 so that the working fluid may easily flow into the pilot chamber 1315 and the main chamber 1325. In addition, a cross-sectional area of the main flow path 1323 communicating with the main chamber 1325 may be formed to be larger than that of the slit 1343 communicating with the pilot chamber 1315.

The pilot disc 1350 is coupled to the piston rod 1100 and disposed in close contact with the upper portion of the housing 1310. The pilot disk 1350 covers the open portion of the housing 1310 so as to block the inflow of the working fluid from the upper portion of the housing 1310 into the pilot chamber 1315. In addition, the pilot disk 1350 is elastically deformed to prevent sustained pressure rise of the pilot chamber 1315. For example, the pilot disk 1350 is elastically deformed so that the working fluid passes through thereof depending on the pressure rise of the pilot chamber 1315 during the rebound stroke. The pilot disk 1350 may be provided in at least one disk type.

In addition, the valve assembly 1300 may further include at least one disk 1360 interposed between the pilot valve 1330 and the main retainer 1320. The disk 1360 is installed to adjust elastic deformation coefficient of the pilot valve 1330, and may be installed by increasing or decreasing the number of disks 1360 according to the needs of a designer and a driver.

As such, the frequency sensitive type shock absorber 1000 is reliably assembled by predetermined components so that the piston valve 1200 and the valve assembly 1300 move together with the piston rod 1100 and implement damping force generation performance. As shown in drawings, an upper washer 220 is mounted on the piston rod 1100 through a spacer 222 on the upper portion of the piston valve 1200 and a lower washer 230 is mounted on the piston rod 1100 through a spacer 232 on the lower portion of the piston valve 1300. And, a nut 240 is fastened to the piston rod 1100 under the lower washer 230. Accordingly, the piston valve 1200 and the valve assembly 1300 which are mounted on the piston rod 1100 maintain a tightly coupled state in an axial direction of the piston rod 1100 and may be provided to move together with the piston rod 1100.

Then, operating state in which the damping force is generated according to the operation of the frequency sensitive type shock absorber 1000 as described above will be described.

First, as described above, the piston valve 1200 generates the damping force by allowing the working fluids of the compression chamber 110 and the rebound chamber 120 to move through the compression flow paths 1210 and the rebound flow paths 1220 formed in the piston valve 1200 during the compression and rebound strokes. At this time, since the valve assembly 1300 does not generate the damping force during the compression stroke, the operation of the valve assembly 1300 during the rebound stroke will be described with reference to FIGS. 3 and 4.

Referring to FIG. 3, during the low-frequency (when amplitude is large) rebound stroke, the working fluid flows into the pilot chamber 1315 and the main chamber 1325 through the connection passage 1110 of the piston rod 1100. That is, the working fluid flows into the pilot chamber 1315 through the slit 1343 of the inlet disc 1340 and at the same time flows into the main chamber 1325 through the main flow path 1323 of the main retainer 1320. At this time, as the stroke of the piston rod 1100 operates significantly, the working fluid may be smoothly flowed into the pilot chamber 1315 through the slit 1343 of the inlet disc 1340. Accordingly, the pressure of the working fluid flowed into the pilot chamber 1315 and the main chamber 1325 is balanced, so that the pilot valve 1330 maintains contact with the upper portion of the main retainer 1320 and the lower portion of the housing 1310.

On the other hand, when the pressure increases to a predetermined pressure or more as the inflow amount of the working fluid flowing into the pilot chamber 1315 increases, the working fluid is discharged as the pilot disk 1350 provided on the upper portion of the housing 1310 is elastically deformed. Accordingly, the sustained pressure rise in the pilot chamber 1315 by the pilot disk 1350 may be prevented.

Next, during the high-frequency (when the amplitude is small) rebound stroke, as shown in FIG. 4, the working fluid flows into through the connection passage 1110. At this time, due to inflow resistance generated while the working fluid passes through the narrow cross-sectional area of the slit 1343 of the inlet disc 1340, the inflow amount into the pilot chamber 1315 is small, thereby limiting the pressure rise. Accordingly, the pilot valve 1330 is elastically deformed and spaced apart from the upper portion of the main retainer 1320 depending on the pressure difference (the pressure in the main chamber is greater than the pressure in the pilot chamber) due to the inflow amount of the working fluid flowing into the main chamber 1325, thereby opening the main chamber 1325. That is, the damping force may be implemented while the pilot valve 1330 is opened toward the pilot chamber 1315 by the working fluid flowing into the main chamber 1325 during the high-frequency rebound stroke.

Meanwhile, during the high-frequency rebound stroke, the adjustment stability may be prevented from being deteriorating in a low-speed section by preventing a decrease in the damping force, and the ride comfort may be improved by generating the damping force performance in a middle-high-speed section.

That is, as shown in FIG. 9, in the frequency sensitive type shock absorber 1000 according to the present embodiment, by controlling the inflow amount of the working fluid flowed through the connection passage 1110 into the pilot chamber 1315 and the main chamber 1325 during the rebound stroke, similar damping force is realized at the low-frequency and the high-frequency in the low-speed section, and the damping force is variable depending on the low and high frequencies in a medium-high-speed section, so that the vehicle's ride comfort and adjustment stability may be satisfied simultaneously.

Meanwhile, in a frequency sensitive type shock absorber 2000 according to an aspect of the present disclosure, a main retainer 2320 may be provided to be movably depending on the pressure difference by supporting an axial force in a vertical direction during the compression and rebound strokes, and such an embodiment is illustrated in FIGS. 5 to 8.

FIG. 5 is a cross-sectional view showing the frequency sensitive type shock absorber according to another embodiment of the present disclosure, FIG. 6 is an exploded perspective view showing a valve assembly provided in the frequency sensitive type shock absorber according to another embodiment of the present disclosure, FIG. 7 is a diagram showing the operating state of the valve assembly during a low-frequency rebound stroke of the frequency sensitive type shock absorber according to another embodiment of the present disclosure, FIG. 8 is a view showing the operation state of the valve assembly during a high-frequency rebound stroke of the frequency sensitive type shock absorber according to another embodiment of the present disclosure.

Herein, the same reference numerals as in the abovementioned drawings indicate members having the same function.

Referring to FIGS. 5 to 8, a frequency sensitive type shock absorber 200 according to the present embodiment includes the piston rod 1100 reciprocating inside the cylinder 100, the piston valve 1200 mounted on the piston rod 1100, a valve assembly 2300 disposed under the piston valve 1200, and a support member 2400 mounted to the piston rod to support the valve assembly 2300. That is, the present embodiment differs from the previous embodiment in the structure in which the valve assembly 2300 is mounted on the support member 2400 installed on the piston rod 1100.

The support member 2400 includes a first support 2410 mounted on the piston rod 1100 and a second support 2420 mounted on a lower portion of the first support 2410.

The first support 2410 may have a cylindrical shape, and a passage hole 2413 communicating with the connection passage 1110 formed in the piston rod 1100 is formed thereon. At this time, the passage hole 2413 may be formed to be disposed at a position corresponding to the connection hole 1113 of the connection passage 1110. Accordingly, the passage hole 2413 is disposed between the pilot chamber 1315 and a main chamber 2325 to communicate the pilot chamber 1315 and the main chamber 2325 with the connection passage 1110. The first support 2410 is formed to have a predetermined length so that the valve assembly 2300 is coupled to be located on an exterior of the first support 2410. This is because the first support 2410 supports the axial force in the vertical direction to allow movement of a main retainer 2320 to be described later in a vertical direction in a certain section, and the operation structure thereof will be described again below.

The second support 2420 may have a ring-shaped disk type, and be provided to be elastically deformable. The second support 2420 is coupled to the first support 2410 and serves to support the lower portion of the main retainer 2320. The operation state of the second support 2420 will be described again below.

The valve assembly 2300 according to the present embodiment is coupled to the support member 2400 and is disposed at a lower portion of the piston valve 1200. The valve assembly 2300 includes the housing 1310 in which the pilot chamber 1315 is formed in a lower portion thereof, the main retainer 2320 disposed in the lower portion of the housing 1310 and the main chamber 2325 is formed in the upper portion of the main retainer 2320, the pilot valve 1330 disposed between the housing 1310 and the main retainer 2320 to partition the pilot chamber 1315 and the main chamber 2325, at least one or more disks 1360 interposed between the pilot valve 1330 and the main retainer 2320, the inlet disk 1340 interposed between the housing 1310 and the pilot valve 1330, and the pilot disk 1350 provided to cover the open upper portion of the housing 1310.

The housing 1310, the inlet disc 1340, the pilot valve 1330, the at least one or more discs 1360, and the main retainer 2320 are arranged to be sequentially stacked to be coupled to the first support 2410. In addition, the second support 2420 is coupled to the first support 2410 to be in contact with the lower portion of the main retainer 2320 to support the main retainer 2320.

The main retainer 2320 includes a first seat portion 2321, in which the piston rod 1100 coupled with the first support 2410 penetrates centrally, and which protrudes at regular intervals along an inner edge of the main retainer 2320, and a ring-shaped second seat portion 2322 stepped protruding from an outer edge of the main retainer 2320. Accordingly, the main chamber 2325 may be formed between the first seat portion 2321 and the second seat portion 2322.

The upper surfaces of the first seat portion 2321 and the second seat portion 2322 may be in contact with the pilot valve 1330 positioned at the upper portion or the disk 1360 provided at the lower portion of the pilot valve 1330. In addition, as the first seat portion 2410 is formed to protrude at regular intervals along the inner edge of the main retainer 2320 hollowed by the piston rod 1100 and the first support 2410, a main flow path 2323 connected to the passage hole 2413 is provided between the first seat portions 2410 spaced apart from each other.

The main retainer 2320 has a tapered portion 2324 so that a lower surface thereof is tapered. The tapered portion 2324 is provided in a form in which the thickness gradually decreases toward the center of the main retainer 2320. Accordingly, a lower portion of the outer edge of the main retainer 2320 is supported on the upper surface of the second supporter 2420, and a lower inner portion of the main retainer 2320 is provided in a state spaced apart from the second supporter 2420. Accordingly, when the working fluid flows into the main chamber 2325 and a predetermined pressure is generated, the main retainer 2320 is moved downward by the tapered portion 2324. In addition, when the pressure of the main chamber 2325 increases, the pilot valve 1330 is elastically deformed and spaced apart from the upper portion of the main retainer 2320 to open the main chamber 2325, and also the outer edge of the main retainer 2320 may be elastically deformed together with the second support 2420 by the second support 2420. That is, the main retainer 2320 is supported by the axial force on the first support 2410, and also may be movable up and down according to the pressure of the main chamber 2325 by the second support 2420 located thereunder.

Meanwhile, the spacer 232 is interposed between the lower portion of the second support 2420 and the lower washer 230 to provide a space for the second support 2420 to be elastically deformable.

As described above, the frequency sensitive type shock absorber 200 generates the damping force only through the piston valve 1200 during the compression stroke, and generates the damping force together with the valve assembly 2300 during the rebound stroke.

In addition, the operating structure of the valve assembly 2300 changes depending on the frequency during the rebound stroke. For example, during the low-frequency rebound stroke, as shown in FIG. 7, the working fluid flows into the pilot chamber 1315 and the main chamber 2325 through the connection passage 1110 of the piston rod 1100 and the passage hole 2413 of the first support 2410, respectively. That is, the working fluid flows into the pilot chamber 1315 through the slit 1343 of the inlet disc 1340 and at the same time flows into the main chamber 2325 through the main flow path 2323 of the main retainer 2320. At this time, the pressure of the working fluid introduced into the pilot chamber 1315 and the main chamber 2325 is balanced, so that the pilot valve 1330 maintains contact with the upper portion of the main retainer 2320 and the lower portion of the housing 1310.

Referring to FIG. 8, during the high-frequency rebound stroke, the working fluid introduced through the connection passage 1110 and the passage hole 2413. At this time, due to the inflow resistance generated while the working fluid passes through the narrow cross-sectional area of the slit 1343 of the inlet disc 1340, the inflow amount into the pilot chamber 1315 is small, thereby limiting the pressure rise. As a result, the pilot valve 1330 is elastically deformed and spaced apart from the upper portion of the main retainer 2320 according to the pressure difference due to the inflow amount of the working fluid flowing into the main chamber 2325, thereby opening the main chamber 2325 to implement the damping force. In addition, as the pressure in the main chamber 2325 rises, the main retainer 2320 may be moved downward while elastically deforming the second support 2420 by the tapered portion 2324.

Meanwhile, during the high-frequency rebound stroke, the adjustment stability may be prevented from being deteriorating in the low-speed section by preventing the decrease in the damping force, and the ride comfort may be improved by generating the damping force performance in the middle-high-speed section.

Therefore, as shown in FIG. 9, in the frequency sensitive type shock absorber 2000 according to the present embodiment, like the frequency sensitive type shock absorber 1000 of the previous embodiment, by controlling the inflow amount of the working fluid flowed through the connection passage 1110 and the passage hole 2413 into the pilot chamber 1315 and the main chamber 2325 during the rebound stroke, similar damping force is realized at the low-frequency and the high-frequency in the low-speed section, and the damping force is variable depending on the low and high frequencies in the medium-high-speed section, so that the vehicle's ride comfort and adjustment stability may be satisfied simultaneously.

While the present disclosure has been particularly described with reference to exemplary embodiments, it should be understood by those of skilled in the art that various changes in form and details may be made without departing from the spirit and scope of the present disclosure.

What is claimed is:

1. A frequency sensitive type shock absorber comprising:
   a piston rod reciprocating an inside of a cylinder and having a connection passage therein;
   a piston valve mounted on the piston rod and having a plurality of compression and rebound flow paths penetrating up and down thereof, and partitioning the cylinder into compression and rebound chambers; and
   a valve assembly mounted on the piston rod to generate a damping force that changes with frequency during a rebound stroke;
   wherein the valve assembly comprises:
   a housing coupled to the piston rod and having a pilot chamber in communication with the connection passage;
   a main retainer coupled to the piston rod and having a main chamber in communication with the connecting passage; and
   a pilot valve coupled to the piston rod and disposed between the housing and the main retainer to partition the pilot chamber and the main chamber,
   wherein the pilot valve is provided to be elastically deformable by pressure difference between the main chamber and the pilot chamber.

2. The frequency sensitive type shock absorber according to claim 1,
   wherein the main retainer comprises:
   a first seat portion through which the piston rod penetrates centrally, and protruding at regular intervals along an inner edge thereof; and
   a second seat portion having a ring-shaped and stepped protruding from an outer edge of the main retainer;
   wherein the main chamber is formed between the first seat portion and the second seat portion, and
   a main flow path in communication with the connection passage is provided between the first seat portions.

3. The frequency sensitive type shock absorber according to claim 1,
   wherein the pilot valve comprises:
   a body portion whose a bottom surface is in close contact with the upper portion of the main retainer; and
   a valve portion protruding along an outer edge portion of the body portion to be close contact with an inner surface of the housing, and elastically deformable depending on pressure difference due to an inflow amount of the working fluid flowing into the main chamber.

4. The frequency sensitive type shock absorber according to claim 1,
   wherein the pilot valve is in contact with the upper portion of the main retainer during a low-frequency stroke, and is spaced apart from the upper portion of the main retainer to open the main chamber during a high-frequency stroke.

5. The frequency sensitive type shock absorber according to claim 1, further comprising an inlet disc interposed between the housing and the pilot valve and having at least one slit communicating the connection passage and the pilot chamber.

6. The frequency sensitive type shock absorber according to claim 1, further comprising a pilot disk coupled to the piston rod, and disposed in close contact with the upper portion of the housing to be elastically deformable.

7. The frequency sensitive type shock absorber according to claim 1, further comprising at least one or more disks interposed between the pilot valve and the main retainer.

8. A frequency sensitive type shock absorber comprising:
   a piston rod reciprocating an inside of a cylinder and having a connection passage therein;

a piston valve mounted on the piston rod and having a plurality of compression and rebound flow paths penetrating up and down thereof, and partitioning the cylinder into compression and rebound chambers; and a valve assembly mounted on the piston rod to generate a damping force that changes with frequency during a rebound stroke;

wherein the valve assembly comprises:

a housing coupled to the piston rod and having a pilot chamber in communication with the connection passage;

a main retainer coupled to the piston rod and having a main chamber in communication with the connecting passage; and a pilot valve coupled to the piston rod and disposed between the housing and the main retainer to partition the pilot chamber and the main chamber;

wherein the pilot valve is in contact with the upper portion of the main retainer during a low-frequency stroke, and is spaced apart from the upper portion of the main retainer to open the main chamber during a high-frequency stroke.

9. The frequency sensitive type shock absorber according to claim 8, wherein the main retainer comprises:

a first seat portion through which the piston rod penetrates centrally, and protruding at regular intervals along an inner edge thereof; and a second seat portion having a ring-shaped and stepped protruding from an outer edge of the main retainer;

wherein the main chamber is formed between the first seat portion and the second seat portion, and a main flow path in communication with the connection passage is provided between the first seat portions.

10. The frequency sensitive type shock absorber according to claim 8, wherein the pilot valve comprises:

a body portion whose a bottom surface is in close contact with the upper portion of the main retainer; and a valve portion protruding along an outer edge portion of the body portion to be close contact with an inner surface of the housing, and elastically deformable depending on pressure difference due to an inflow amount of the working fluid flowing into the main chamber.

11. The frequency sensitive type shock absorber according to claim 8, further comprising an inlet disc interposed between the housing and the pilot valve and having at least one slit communicating the connection passage and the pilot chamber.

12. The frequency sensitive type shock absorber according to claim 8, further comprising a pilot disk coupled to the piston rod, and disposed in close contact with the upper portion of the housing to be elastically deformable.

13. The frequency sensitive type shock absorber according to claim 8, further comprising at least one or more disks interposed between the pilot valve and the main retainer.

14. A frequency sensitive type shock absorber comprising:

a piston rod reciprocating an inside of a cylinder and having a connection passage therein;

a piston valve mounted on the piston rod and having a plurality of compression and rebound flow paths penetrating up and down thereof, and partitioning the cylinder into compression and rebound chambers; and a valve assembly mounted on the piston rod to generate a damping force that changes with frequency during a rebound stroke;

wherein the valve assembly comprises:

a housing coupled to the piston rod and having a pilot chamber in communication with the connection passage;

a main retainer coupled to the piston rod and having a main chamber in communication with the connecting passage;

a pilot valve coupled to the piston rod and disposed between the housing and the main retainer to partition the pilot chamber and the main chamber; and an inlet disc interposed between the housing and the pilot valve and having at least one slit communicating the connection passage and the pilot chamber.

15. The frequency sensitive type shock absorber according to claim 14, wherein the main retainer comprises:

a first seat portion through which the piston rod penetrates centrally, and protruding at regular intervals along an inner edge thereof; and a second seat portion having a ring-shaped and stepped protruding from an outer edge of the main retainer;

wherein the main chamber is formed between the first seat portion and the second seat portion, and a main flow path in communication with the connection passage is provided between the first seat portions.

16. The frequency sensitive type shock absorber according to claim 14, wherein the pilot valve comprises:

a body portion whose a bottom surface is in close contact with the upper portion of the main retainer; and a valve portion protruding along an outer edge portion of the body portion to be close contact with an inner surface of the housing, and elastically deformable depending on pressure difference due to an inflow amount of the working fluid flowing into the main chamber.

17. The frequency sensitive type shock absorber according to claim 14, further comprising a pilot disk coupled to the piston rod, and disposed in close contact with the upper portion of the housing to be elastically deformable.

18. The frequency sensitive type shock absorber according to claim 14, further comprising at least one or more disks interposed between the pilot valve and the main retainer.

* * * * *